United States Patent [19]
Bernard et al.

[11] Patent Number: 6,060,413
[45] Date of Patent: *May 9, 2000

[54] ARTIFICIAL MINERAL WOOL COMPOSITION

[75] Inventors: Jean-Luc Bernard, Clermont; Alain de Meringo; Enrique Garcia-Lopez, both of Paris, all of France; Hans Furtak, Speyer-am-Rhein, Germany; Fabrice Lafon, Paris, France

[73] Assignee: Isover Saint-Gobain, Courbevoie, France

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/814,176

[22] Filed: Mar. 7, 1997

[30] Foreign Application Priority Data

Jan. 14, 1997 [FR] France ................................. 97/00259

[51] Int. Cl.⁷ .................................................. C03C 13/06
[52] U.S. Cl. ................................................ 501/36; 501/66
[58] Field of Search ..................... 501/35, 36, 66

[56] References Cited

U.S. PATENT DOCUMENTS

| | | | |
|---|---|---|---|
| 4,615,988 | 10/1986 | Le Moigne et al. ............... | 501/35 |
| 5,108,957 | 4/1992 | Cohen et al. ...................... | 501/35 |
| 5,332,698 | 7/1994 | Nyssen et al. ..................... | 501/35 |
| 5,401,693 | 3/1995 | Bauer et al. ....................... | 501/36 |
| 5,523,264 | 6/1996 | Mattson ............................. | 501/35 |
| 5,523,265 | 6/1996 | Rapp et al. ........................ | 501/35 |

FOREIGN PATENT DOCUMENTS

| | | | |
|---|---|---|---|
| 412878B1 | 3/1994 | European Pat. Off. ........ | C03C 13/00 |
| 459897B1 | 4/1995 | European Pat. Off. ........ | C03C 13/06 |
| 0 739 862 | 10/1996 | European Pat. Off. . | |
| 0 741 114 | 11/1996 | European Pat. Off. . | |
| 195 30 030 | 2/1997 | Germany . | |
| 95/22251 | 11/1993 | WIPO ............................ | C03C 13/06 |
| 95 35265 | 12/1995 | WIPO . | |
| 95/32927 | 12/1995 | WIPO ............................ | C03C 13/00 |

OTHER PUBLICATIONS

Russell M. Potter and Stephanie M. Mattson, "Glass fiber dissolution in a physiological saline solution", Glastechnische Berichte, vol. 64, No. 1, Jan. 1, 1991, pp. 16–28.

*Primary Examiner*—Karl Group
*Attorney, Agent, or Firm*—David Bennett

[57] ABSTRACT

The subject of the invention is a mineral wool composition capable of dissolving in a physiological medium which comprises the constituents below, having to the following percentages by weight:

| | |
|---|---|
| $(CaO + MgO + BaO + Na_2O + K_2O + B_2O_3) - 2 \times Al_2O_3$ | >30* |
| RO | 13.5 to 19.5% |
| $R_2O$ | 14.2 to 23% |
| $RO/R_2O$ | 0.70 to 0.95 |
| CaO/MgO | >1.5 |
| $SiO_2$ | 47 to 58.5% |
| $Al_2O_3$ | 0 to 3.5% |
| $B_2O_3$ | 5 to 10% |
| $Fe_2O_3$ (total iron) | 0 to 3.0% | where:

RO means oxides of the elements from column 2a of the Periodic Table, including CaO, MgO, BaO and SrO; and $R_2O$ means oxides from column 1a of the Periodic Table, including $Na_2O$, $K_2O$ and $Li_2O$.

32 Claims, No Drawings

ARTIFICIAL MINERAL WOOL COMPOSITION

BACKGROUND OF THE INVENTION

The present intention relates to the field of artificial mineral wools. It is more specifically targeted at mineral wools intended to manufacture thermal and/or acoustic insulation materials or substrates for soil-less culture and in particular those more commonly denoted under the term of glass wool or rock wool.

The mineral wools concerning the invention are generally obtained by fiberizing processes of the so-called internal centrifuging type comprising, in general terms, pouring a molten mass of the vitrifiable raw materials into a centrifuge rotating at high speed, the periphery of which is pierced by a large number of orifices, and projecting the molten mass from the orifices in the form of filaments which are carried away and drawn into fibers by a gaseous stream at a high temperature. For more details regarding this type of technique, reference may advantageously be made, for example, to Patent EP-B-0,519,797.

In recent years, there has been much debate on the question of knowing whether this type of mineral wool could be harmful to the health, at least as regards the portion of fibers with a fineness which enables them to be accidentally inhaled. There has been speculation over the potentially pathogenic, in particular carcinogenic, nature of an excessively large accumulation of fibers in the body. This is the reason why a number of studies have been carried out in order to adapt the chemical composition of these fibers in order for them to exhibit biodegradable properties, in the sense that they can dissolve rapidly in physiological medium.

New glass compositions have thus been developed for the purpose of increasing as far as possible this biodegradability, while retaining the other properties desired for this type of mineral wool, in particular their ability to be fiberized by conventional fiberizing techniques, their mechanical properties and their temperature behavior, As an example, European Patent Application EP-0,412,878 describes mineral wools obtainable by internal centrifugation processes which have been shown to demonstrate solubility in physiological medium in vitro.

Studies have recently been carried out in Germany for the purpose of quantifying the biodegradability of mineral wools, which studies have resulted in a government recommendation which is based on the calculation of an index known as "KI". This recommendation specifies that, using this index, it is possible to classify mineral wools in various categories. Of particular interest is a category, (referred to as "category III"), which includes mineral wools with a KI index greater than 30 and less than 40, and a category corresponding to mineral wools with a RI index of at least 40. In the case of category III wools, a KI index of 30 to 40 constitutes a first level of harmlessness of the wools, in which it is necessary subsequently to confirm harmlessness by additional tests. In the second case, with a KI index of at least 40, it is possible to treat the mineral wools as harmless, without additional tests being necessary. This KI index is calculated using the percentages by weight of alkali metal oxides $Na_2O$ and $K_2O$, of alkaline-earth metal oxides CaO, MgO and BaO, of alumina $Al_2O_3$ and of boron oxide $B_2O_3$ in the following way:

$$KI = \Sigma(Na_2O + K_2O + CaO + MgO + BaO + B_2O_3 - 2 \times Al_2O_3)$$

This very general formula allows a great number of compositions, depending on the amounts of the various constituents used to calculate this index, and depending on the nature and the amount of the additional constituents of the composition, in particular silica mostly, or alternatively iron, and the like.

A first group of mineral wool compositions observing a KI index value of at least 40 has been described in U.S. Pat. No. 5,523,26S and U.S. Pat. No. 5,523,264. In the compositions described the level of alumina is low and, in contrast, the level of boron oxide used is significantly high, of the order of 15%.

This choice is not without disadvantages, in particular of an economic nature. Raw materials containing boron are among the most expensive of the vitrifiable materials commonly used in formulating mineral wool compositions.

Other mineral wool compositions having a KI index value of greater than 40 have been described in Patent WO-95/32927. These compositions also contain a relatively high level of boron oxide and low levels of alkaline-earth metal oxides.

The aim of the invention is consequently the development of new mineral wool compositions, in particular of the type of that obtained by internal centrifuging, in particular glass wool compositions, which exhibit a biodegradable nature, being reflected in particular by a KI index value of greater than 30 and, preferably, of at least 40, without this property being obtained to the detriment of other advantageous properties, (in particular in terms of ability to be fiberized, temperature behavior or mechanical properties), while taking into account, and while limiting as far as possible, the manufacturing costs and in particular those related to the choice of the vitrifiable starting materials.

DESCRIPTION OF THE INVENTION

The subject of the invention is a mineral wool of artificial type capable of dissolving in physiological medium and which comprises, as percentages by weight, the following constituents:

| | | |
|---|---|---|
| (a) | $(CaO + MgO + BaO + Na_2O + K_2O + B_2O_3) - 2 \times Al_2O_3$ | > 30% |
| (b) | RO | 13.5 to 19.5% |
| (c) | $R_2O$ | 14.2 to 23% |
| (d) | $RO/R_2O$ | 0.70 to 0.95 |
| (e) | CaO/MgO | >1.5 |
| (f) | $SiO_2$ | 47.0 to 58.5% |
| (g) | $Al_2O_3$ | 0 to 3.5% |
| (h) | $B_2O_3$ | 5.0 to 10% |
| (i) | $Fe_2O_3$, (total iron expressed in this form) | 0 to 3% | wherein RO indicates oxides of the elements from column 2a of the Periodic Table including CaO, MgO, BaO and SrO; and $R_2O$ indicates oxides from column 1a of the Periodic Table, including $Na_2O$, $K_2O$ and $Li_2O$.

As regards the relationship (a), which reflects the calculation of the KI index discussed above, two choices may be made: either 1) the percentages by weight of all the components entering into the relationship (a) are selected so as to result in a value greater than 30% but less than 40%, for example greater than 35% and less than 40% or greater than or equal to 37.5% and less than 40%. Mineral wool compositions are thereby defined which can be classified in category III of the German government recommendation mentioned above, in which "validation" of their harmlessness by additional tests is required; or 2) the percentages by weight of these components are selected to result in a value greater than or equal to 40%, which suffices to prove their harmlessness, still according to the same government recommendation.

The general formulation of the compositions according to the invention is the fruit of a very advantageous compromise between various parameters which has made it possible to confer the desired properties on the mineral wool without substantially increasing the manufacturing constraints related to the fiberizing technique employed or their production cost.

Indeed, the condition imposed at the start was the biodegradable nature of the wools, with the German government recommendation being followed in the use of the relationship (a). As an enormous number of mineral compositions can be defined by this relationship (a), it was then necessary to study as far as possible, first of all, the most judicious way in which the respective contents of the oxides implicated by this relationship (a) could be "distributed" in order to obtain the minimum RI index value of at least 30, and preferably of at least 40, which was necessary The choice fell on a relatively moderate level of boron oxide which, according to the relationship (h), does not exceed 10%. This selection was made for an essentially economic reason: the vitrifiable materials containing boron are much more expensive than the others, more expensive even than vitrifiable materials introducing sodium, for example. It was, however, important to choose a minimum boron oxide level of 5% in particular for two reasons. On the one hand, it has a positive influence on the biodegradability of the mineral wool since it is immediately seen from the relationship (a) that any additional percentage point of boron oxide, if achieved by a corresponding decrease in the level of silica or any other component that is not part of the formula (a), results in a corresponding increase in the value of the KI index. In addition the presence of boron oxide at a sufficient level makes it possible to confer, on the mineral wool, the thermal insulation properties which are being sought, while tending to lower the thermal conductivity. It has in fact been observed that the radiative component of the thermal conductivity of mineral wool gradually decreased when the boron content was increased in the range of values recommended by the invention. There was in particular a marked decrease in the range from 5 to 7 or 8% which tends to become, diagrammatically, asymptotic towards a minimum value beyond 7 to 8%, such that the gain in terms of improved thermal insulation property thus becoming less noticeable at the top of the proposed range. Finally, at a constant KI index, this moderate range of boron oxide contents, combined with a relatively high range of alkaline-earth metal oxide (RO) content, makes it possible to reconcile, as far as possible, reduction in cost and ability to be fiberized. Ease of fiberization of these formulations is reflected by liquidus temperature and viscosity values of the glass obtained during fiberizing which are compatible with internal centrifuging techniques.

The choice of an RO content according to the relationship (b), that is between 13.5 and 19.5% makes it possible to reconcile different requirements. This fairly high range of values is very favorable economically because, at a constant KI index, it makes it possible to correspondingly decrease the levels of boron oxide and, to a lesser extent, of sodium oxide. In addition, it has been observed, rather unexpectedly, that such high RO contents have at positive influence on the durability of the mineral wool, most particularly in aqueous medium, which is reflected by good hydrolytic resistance results when evaluated by the so-called "DGG" test In addition, it may be emphasized that it might have been expected that such high alkaline-earth metal oxide contents would result in very high liquidus temperature values. However it turned out that, with such contents, it was possible to maintain the liquidus temperature at values which make possible satisfactory fiberizing by internal centrifuging.

The fairly high Cao/MgO ratio according to the relationship (e) makes it possible to increase as far as possible the hydrolytic resistance, calcium oxide playing a very favorable role with respect to this property. However, it is not pointless also to provide for the presence, even in much smaller contents than CaO, of magnesium oxide MgO. Indeed, to permit a certain MgO content in the composition of the fibers makes possible the use of a high level of cullet in the vitrifiable materials used, which obviously contributes to reducing the production costs, in particular as regards the starting materials. "Cullet" is understood to be recycled glass, which can be of various origins, in particular which can originate from glass fibers, from flat glass or from hollow ware.

The alkali metal oxides, $R_2O$, generally comprise, to a major extent $Na_2O$ and to a minor extent $K_2O$, with the total amount defined by relationship (c). This component rather acts to "complement" the contents of boron oxide and of alkaline-earth metal oxides CaO, MgO and BaO, in order to reach the KI index value of 40. Of course, a minimum level of alkali metal oxides is required in order to play the well known role of fluxing agent; this level of at least 14.2% in fact often characterizes so-called glass wool, in comparison with so-called rock wool. Moreover, it should be noted that the upper limit of alkali metal oxides has also been chosen as a function of the durability targeted for the mineral wool. It has indeed been found that excessive $Na_2O$ contents could result in a fairly significant lowering, in particular, of the hydrolytic resistance of the mineral wool.

The ratio of the sum of the alkaline-earth metal oxides to the sum of the alkali metal oxides $RO/R_2O$, as selected in the relationship (d), is advantageous in a number of respects. This ratio is bounded by two values which make it possible to adjust as far as possible the proportion of the alkaline-earth metal oxides RO with respect to that of the alkali metal oxides $R_2O$ in the KI index. The maximum value of 0.95 is important in the sense that it guarantees that the vitrifiable materials can be easily fiberized by internal centrifuging. A ratio which would exceed this threshold would tend to increase, under excessively high conditions, the liquidus temperature and to decrease excessively the "working range" which is the range of temperature in which it is possible to fiberize by internal centrifuging. The working range, ΔT, which can be conventionally defined by the difference between the temperature $T_{log\ 2.5}$, at which the molten mass of vitrifiable materials reaches a viscosity, in poises, corresponding to log 2.5 and the liquidus temperature $T_{liq}$. The minimum value of 0.70 can also be justified both for reasons of cost and of industrial feasibility. It is a good compromise in the sense that a satisfactory working range retained, without having an excessively high proportion of alkali metal oxides with respect to the alkaline-earth metal oxides, which would be penalizing in terms of raw material cost.

The level of alumina $Al_2O_3$ is preferably, according to the relationship (g), confined to low, indeed zero, values first because it has a tendency to lower the value of the KI index. When the alumina level increases by one point, it is necessary to raise the level of alkali metal oxides and/or of alkaline-earth metal oxides and/or of boron oxide by two points just to keep the KI index constant In addition, this tends to correspondingly decrease the levels of the other constituents not mentioned in the calculation of the KI index, and very particularly silica. This directly influences the viscosity of the vitrifiable materials, tending to lower it to such an extent that it can prevent fiberizing by internal centrifuging. However a moderate level of alumina is not necessarily without advantages.

The alumina can be present at very low levels, for example an impurity introduced, for example, by the starting material containing silica. The addition of a small amount of alumina has a tendency to have a favorable effect on the durability of the mineral wool, in particular on its hydrolytic resistance.

As regards the level of silica, which is an essential component of the mineral wool, it is in this instance variable within a fairly low range of values, which is in particular due to the high content of alkaline-earth metal oxides, RO, in the mineral wool and to the choice of a KI index greater than 30 and in particular of at least 40.

Where it is desirable that the KI index be above 40, it preferably has a value of between 40 and 42 and particularly between 40.2 and 41.

The invention has selected preferred areas of contents in the ranges defined above.

Thus, the sum of the contents of alkaline-earth metal oxides RO is preferably adjusted between 14 and 17%, in particular between 15 and 16%.

Likewise, the sum of the contents of alkali metal oxides $R_2O$ can be chosen between 15 and 22%, in particular between 17 and 20%.

The $RO/R_2O$ ratio is preferably between 0.70 and 0.94, and in particular between 0.75 and 0.85.

The ratio of the contents CaO/MgO is preferably greater than or equal to 1.9, and in particular between 2.2 and 14.

The level of silica is preferably between 48 and 58%, and in particular from 55 to 57%.

The level of alumina is either zero or in the region of zero, i.e. between 0.3 and 2.5%, preferably between 0.5 and 1.5%

The level of boron oxide is preferably between 5 and 9%, in particular between 5.2 and 8%.

Constituents which have not yet been discussed, and in particular iron, can additionally be included in the mineral composition. Iron can be absent or present only in the form as impurities. It is thus possible to anticipate a certain level of iron. Advantageously, according to the relationship (i), its content, as percentage by weight of iron expressed as total iron in the $Fe_2O_3$ form, is thus chosen between 0 and 3%, preferably 0.1 to 2%. Its presence can in particular be justified by the fact that it tends to protect centrifuging discs from corrosion.

In the alkaline earth family, use is especially made of lime, CaO, and magnesia, MgO. It is possible not to use other alkaline earths, such as barium oxide BaO, at all. However, it is possible to anticipate a moderate level of BaO, in particular of between 0 and 3%, for example between 0.01 and 2%. Indeed, its presence can facilitate the fiberizing.

The fibers according to the invention can comprise various minor constituents. Thus they can contain each of the following compounds in a percentage by weight of at most 3% ZnO, $TiO_2$, SrO, $Li_2O$, F, MnO, $ZrO_2$, $SO_3$ and $P_2O_5$. In all, the sum of the percentages by weight of these compounds preferably remains less than 5%.

The mineral wool according to the invention preferably has the following composition, as percentages by weight:

| | |
|---|---|
| $SiO_2$ | 55.2 to 58.3% |
| $Al_2O_3$ | 0 to 2.4% |
| CaO | 10.4 to 14% |
| MgO | 1 to 5.5% |
| $Na_2O$ | 17 to 20.5% |
| $K_2O$ | 0 to 1.5% |
| $B_2O_3$ | 5 to 8% |
| $Fe_2O_3$ | 0 to 2% | the remainder to 100% being composed of the residual levels of minor constituents and/or impurities, The fibers of the mineral wool according to the invention advantageously have a mean diameter of between 1 and 10 micrometers and the wool is in particular of the type used to manufacture thermal and/or acoustic insulation products or substrates for soil-less culture.

The chemical compositions as defined above are entirely suited to a fiberizing technique by internal centrifuging. They make it possible in particular to carry our the fiberizing in a working range (defined above) of at least 30° C., in particular of at least 50° C., in particular of between 50 and 100° C. This range is sufficiently wide for it not to be necessary to significantly change the proven techniques and for it only to be necessary, optionally, to adjust as far as possible the operating conditions, in particular the size and the distribution of the orifices of the peripheral band of the centrifuging discs.

The liquidus temperature encountered is generally less than 1150° C., in particular less than 1100° C., and preferably between 910 and 950° C.

The fiberizing minimum viscosity temperature $T_{log\ 2.5}$, i.e. in this instance the temperature at which the viscosity of the molten mass to be fiberized, is log 2.5 expressed as poises, and is generally between 990 and 1010° C.

The mineral wool according to the invention exhibits a satisfactory level of hydrolytic resistance. The results in the DGG test are at most 50 mg/g, in particular at most 40 mg/g, in particular approximately 20 to 35 mg/g. It is recalled that this DGG test consists in immersing 10 g of ground glass, (the size of the grains being 360 and 400 micrometers), in 100 milliliters of water at the boiling point for five hours. After rapid cooling, the solution is filtered and a predetermined volume of the filtrate is evaporated to dryness. The weight of the dry matter obtained makes it possible to calculate the amount of glass dissolved in the water, this amount being expressed as milligrams per gram of glass tested. The lower this value, the more the glass will be regarded as resistant to the attack of water. Values of the order of 20 to 35 mg/g correspond to glasses exhibiting a high resistance.

The chemical compositions according to the invention have the advantage of being particularly compatible with the recycling of cullet in the starting materials: it is thus possible to obtain mineral wool from vitrifiable materials which can contain up to 80% by weight of cullet.

Another subject of the invention is products incorporating, at least in part, mineral wool of the composition set forth above, in particular products for thermal and/or acoustic insulation and for substrates for soil-less culture.

DESCRIPTION OF PREFERRED EMBODIMENTS

Other advantageous characteristics and details emerge from the description below of preferred nonlimiting embodiments.

All the mineral wools described below are obtained by the known so-called internal centrifuging technique:

1) a first series of examples 1 to 4 relating to mineral wool compositions containing a level of boron oxide from approximately 7 to 7.5% by weight, with a KI value of at least 40;
2) a second series of Examples 5 to 9 relating to mineral wool compositions containing a level of boron oxide varying from 5.2 to 8.2% by weight, with a KI index of at least 40;
3) Example 10 relates to a mineral wool composition containing barium oxide with a KI index of at least 40;
4) Examples 11 and 12 relate to mineral wool compositions containing a variable level of MgO and/or with a variable MgO/CaO ratio, while maintaining a sum MgO+CaO of 15.5% and contents of all the other constituents which are identical or similar to those of Example 1, with KI indices of at least 40; and
5) Example 13 relates to a mineral wool composition containing slightly higher levels of alumina and of boron oxide than in the preceding examples, with a KI value of between 30 and 40.

In all these examples, the contents are to be understood as percentages by weight. When the sum of all the contents of all the compounds is slightly less than 100%, it is to be understood that the residual level corresponds to the non-analyzed minor components and/or impurities. If, in contrast, it is slightly greater than 100%, the reason arises from the tolerances allowed with respect to the analyses in this area.

Table 1 below indicates the chemical compositions of the fibers according to the above examples and the associated values of RO, $R_2O$, the CaO/MgO ratios and the KI index as they have been defined above:

TABLE 1

| | EX. 1 | EX. 2 | EX. 3 | EX. 4 | EX. 5 | EX. 6 | EX. 7 | EX. 8 | EX. 9 | EX. 10 | EX. 11 | EX. 12 | EX. 13 |
|---|---|---|---|---|---|---|---|---|---|---|---|---|---|
| $SiO_2$ | 56.3 | 55.9 | 55.4 | 56.75 | 58.21 | 57.55 | 56.8 | 55.46 | 55.21 | 57.5 | 56.2 | 56.4 | 57.5 |
| $Al_2O_3$ | 1.07 | 0.5 | 0.45 | 0.7 | 0.57 | 0.55 | 0.53 | 1.1 | 1.55 | 0.5 | 1.08 | 1.05 | 2 |
| CaO | 11.2 | 10.6 | 10.7 | 10.25 | 10.45 | 11.1 | 10.2 | 10.7 | 11.4 | 13.5 | 12.4 | 13.78 | 12 |
| MgO | 4.3 | 4.4 | 4.55 | 4.3 | 5.30 | 4.55 | 5.3 | 4.8 | 3.55 | 1 | 3.1 | 1.72 | 1.5 |
| $Na_2O$ | 19.6 | 19 | 18.3 | 19.15 | 20.27 | 19.93 | 19.54 | 20.1 | 19.75 | 17 | 19.6 | 19.6 | 17.5 |
| $K_2O$ | 0.38 | 0.2 | 0.4 | 0.4 | — | — | — | — | — | — | 0.25 | 0.40 | 0.5 |
| $B_2O_3$ | 7.2 | 7.4 | 7.8 | 7.8 | 5.20 | 6.20 | 7.20 | 7.5 | 8.5 | 8 | 7.3 | 7 | 9 |
| $Fe_2O_3$ | 0.1 | 2 | 2.05 | 0.16 | — | — | — | — | — | — | 0.1 | 0.1 | — |
| BaO | — | — | 0.05 | — | — | — | — | — | — | 1.5 | — | — | — |
| TOTAL | 100.15 | 100 | 99.7 | 99.51 | 100 | 99.98 | 99.57 | 99.66 | 99.96 | 99.5 | 100.03 | 100.05 | 100 |
| RO | 15.5 | 15 | 15.3 | 14.55 | 15.75 | 15.65 | 15.5 | 15.5 | 14.95 | 16 | 15.5 | 15.5 | 13.5 |
| $R_2O$ | 19.98 | 19.2 | 18.7 | 19.55 | 20.27 | 19.93 | 19.54 | 20.1 | 19.75 | 17 | 19.85 | 20 | 18 |
| $RO/R_2O$ | 0.78 | 0.78 | 0.82 | 0.74 | 0.78 | 0.78 | 0.79 | 0.77 | 0.76 | 0.94 | 0.78 | 0.78 | 0.75 |
| CaO/MgO | 2.60 | 2.41 | 2.35 | 2.39 | 1.97 | 2.44 | 1.92 | 2.23 | 3.21 | 13.5 | 4 | 8 | 8 |
| KI index | 40.54 | 40.6 | 40.9 | 40.55 | 40.08 | 40.68 | 41.18 | 40.90 | 40.10 | 40 | 40.49 | 40.4 | 36.5 |

Table 2 below combines, for the fibers of Examples 1, 2, 11 and 12, the results in the DGG test described above:

TABLE 2

| | EX.1 | EX.2 | EX.11 | EX.12 |
|---|---|---|---|---|
| DGG mg/g | 36.7 | 35.1 | 31.7 | 23 |

Table 3 below combines, for Examples 1 to 4, the liquidus temperature $T_{liq}$, fiberizing minimum temperature $T_{log\ 2.5}$ and working range $\Delta T$ values explained above, in degrees Celsius:

TABLE 3

| | $T_{log\ 2.5}$ | $T_{liq}$ | $\Delta T$ |
|---|---|---|---|
| EX. 1 | 1000 | 940 | 60 |
| EX.2 | 991 | 940 | 51 |
| EX.3 | 992 | 940 | 52 |
| EX.4 | 994 | 910 | 84 |

The working ranges of Examples 5 to 13 were evaluated without the values of $T_{liq}$ and $T_{log\ 2.5}$ for each of them being accurately measured: they are all greater than 40° C., which indicates that all the compositions can be fiberized by internal centrifuging. In addition, it should be observed that the rate of crystalline growth of the vitrifiable materials in the molten state during the manufacture of the mineral wool was low, which is highly favorable.

The following conclusions can be drawn from all these data. All the compositions shown in Table 1 allow mineral fibers to be obtained by internal centrifuging. The choice of a high level of alkaline-earth metal oxides did not eventually result in excessive liquidus temperature values, since they remain, for the examples where measurements were carried out, less than 1015° C. overall and of the order of 940 to 980° C.

The data in Table 2 show the importance of the choice of the CaO/MgO ratio with respect to the hydrolytic resistance of the fibers. It emerges from these tests that it is advantageous, if greater importance is given to obtaining very good results in the DGG test to choose high CaO/MgO ratios which are markedly greater than 2, and preferably of the order of 4 or even 8 for example. It may also be observed that all the compositions have a KI index of at least 30 and preferably of at least 40. Operating within the permitted ranges defined by the invention, it is possible for the person skilled in the art to select formulations with a precise optimization of any specific property or combination of properties.

If the selection is driven by material costs, it is preferable to choose compositions containing less than 7 or 8% of $B_2O_3$. However, as Example 3 indicates a very satisfactory formulation with a $B_2O_3$ content of 5.2% can be obtained. It is further shown that the presence of barium oxide, iron and alumina is optional.

What is claimed is:

1. Mineral wool capable of dissolving in a physiological medium consisting of the following constituents in the indicated percentages by weight:

| | |
|---|---|
| (CaO + MgO + BaO + $Na_2O$ + $K_2O$ + $B_2O_3$ − 2 × $Al_2O_3$ | >30% |
| RO | 13.5 to 19.5% |
| $R_2O$ | 14.2 to 23% |
| RO/$R_2O$ | 0.7 to 0.95 |
| CaO/MgO | >1.5 |
| MgO | <5.5% |
| BaO | <2.0% |
| $SiO_2$ | 47.0 to 58.5% |
| $Al_2O_3$ | 0 to 3.5% |
| $B_2O_3$ | 5 to 10% |
| $Fe_2O_3$ (total iron expressed in this form) | 0 to 3% | wherein RO indicates oxides from column 2a of the Periodic Table selected from the group consisting of Cao, MgO, BaO and SrO; $R_2O$ indicates oxides from column 1a of the Periodic Table selected from the group consisting of $Na_2O$, $K_2O$ and $Li_2O$; and wherein the mineral has a liquidus temperature, $T_{liq}$ of less than 1150° C. and a working range, $\Delta T$, of at least 30° C.

2. Mineral wool according to claim 1 in which the constituents are present in percentages by weight that observe the relationship: (CaO+MgO+BaO+$Na_2O$+$K_2O$+$B_2O_3$)−2×$Al_2O_3$ is greater than 30% and less than 40%.

3. Mineral wool according to claim 2 in which the constituents are present in percentages by weight that observe the relationship: (CaO+MgO+BaO+$Na_2O$+$K_2O$+$B_2O_3$)−2×$Al_2O_3$ is not less than 35% and less than 40%.

4. Mineral wool according to claim 1 in which the constituents are present in percentages by weight that observe the relationship: (CaO+MgO+BaO+$Na_2O$+$K_2O$+$B_2O_3$)−2×$Al_2O_3$ is greater than or equal to 40%.

5. Mineral wool according to claim 4 in which the constituents are present in percentages by weight that observe the relationship: (CaO+MgO+BaO+$Na_2O$+$K_2$+$B_2O_3$)−2×$Al_2O_3$ is equal to 40 to 42%.

6. Mineral wool according to claim 5 in which the constituents are resent in percentages by weight that observe the relationship: (CaO+MgO+BaO+$Na_2O$+$K_2O$+$B_2O_3$)−2×$Al_2O_3$ is equal to 40.2 to 41%.

7. Mineral wool according to claim 1 in which the RO content is from 13.5 to 19% by weight.

8. Mineral wool according to claim 7 in which the RO content is from 13.5 to 14.55 by weight.

9. Mineral wool according to claim 1 in which the $R_2O$ content is from 15 to 22% by weight.

10. Mineral wool according to claim 9 in which the $R_2O$ content is from 17 to 20% by weight.

11. Mineral wool according to claim 1 in which the RO/$R_2O$ weight percentage ratio is from 0.70 to 0.94.

12. Mineral wool according to claim 11 in which the RO/$R_2O$ weight percentage ratio is from 0.75 to 0.85.

13. Mineral wool according to claim 1 in which the CaO/MgO weight percentage ratio is at least 1.9.

14. Mineral wool according to claim 1 in which the CaO/MgO weight percentage ratio is from 2.2 to 14.

15. Mineral wool according to claim 1 in which the silica content is from 48 to 58% by weight.

16. Mineral wool according to claim 1 in which the silica content is from 55 to 57% by weight.

17. Mineral wool according to claim 1 in which the alumina content is from 0.3 to 2.5% by weight.

18. Mineral wool according to claim 1 in which the alumina content is from 0.5 to 1.5% by weight.

19. Mineral wool according to claim 1 in which the boron oxide content is from 5 to 9% by weight.

20. Mineral wool according to claim 1 in which the boron oxide content is from 5.2 to 8% by weight.

21. Mineral wool according to claim 1 in which the boron oxide content is from 5 to 9% by weight.

22. Mineral wool according to claim 1 in which the barium oxide content is from 0 to 0.01%.

23. Mineral wool according to claim 1 consisting of the following constituents in the indicated percentages by weight:

| | |
|---|---|
| $SiO_2$ | 55.2 to 58.3% |
| $Al_2O_3$ | 0 to 2.4% |
| CaO | 10.4 to 14.0% |
| MgO | 1 to 5.5% |
| $Na_2O$ | 17 to 20.5% |
| $K_2O$ | 0 to 1.5% |
| $B_2O_3$ | 5 to 8% |
| $Fe_2O_3$ | 0 to 2% |

24. Mineral wool according to claim 1 comprising mineral fibers with mean diameters of from 1 to 10 micrometers.

25. Mineral wool according to claim 1 formed from a mineral having a liquidus temperature, $T_{liq}$, of from 910 to 950° C.

26. Mineral wool according to claim 1 formed from a mineral that exhibits a working range, $\Delta T$, of from 50 to 100° C.

27. Mineral wool according to claim 1 formed from a mineral having a fiberizing minimum viscosity temperature, $T_{log\ 2.5}$, of from 990 to 1100° C.

28. Mineral wool according to claim 1 that is obtained by an internal centrifugation process.

29. Mineral wool according to claim 1 that exhibits a hydrolytic resistance as measured by the DGG test of not more than 50 mg/g.

30. Mineral wool according to claim 29 that exhibits a hydrolytic resistance as measured by the DGG test of from 20 to 35 mg/g.

31. Mineral wool according to claim 1 that is obtained from vitrifiable materials comprising up to 80% by weight of cullet.

32. Mineral wool according to claim 1 forming a component of a product selected form the group consisting of thermal insulation, acoustic insulation and Soil-less culture media.

* * * * *